(12) United States Patent
Miyazaki (10) Patent No.: US 8,576,435 B2
(45) Date of Patent: Nov. 5, 2013

(54) PRINT-DOCUMENT CONVERSION APPARATUS, PRINT-DOCUMENT CONVERSION METHOD, AND COMPUTER-READABLE MEDIUM STORING PROGRAM

(75) Inventor: Koichi Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 495 days.

(21) Appl. No.: 12/903,678

(22) Filed: Oct. 13, 2010

(65) Prior Publication Data

US 2011/0267645 A1 Nov. 3, 2011

(30) Foreign Application Priority Data

Apr. 30, 2010 (JP) ................................ 2010-104999

(51) Int. Cl.
*G06F 3/12* (2006.01)
*G06K 15/00* (2006.01)
*G06K 15/22* (2006.01)
*G06K 9/34* (2006.01)
*G06K 9/54* (2006.01)

(52) U.S. Cl.
USPC ......... 358/1.16; 358/1.1; 358/1.15; 358/1.17; 358/1.4; 382/164; 382/173; 382/180; 382/303

(58) Field of Classification Search
USPC .......... 358/1.15, 1.1, 1.16, 448, 538, 1.2, 1.6, 358/1.4, 1.9, 1.11, 3.31, 1.17, 1.18, 3.01, 358/3.06, 3.22, 3.24, 501, 505, 515, 521, 358/523, 524, 530, 537, 540; 382/100, 305, 382/304, 113, 162, 164, 167, 173, 176, 180, 382/175, 276, 203, 303, 309, 312, 325; 708/230, 231, 233, 534, 650, 682, 706, 708/801

See application file for complete search history.

(56) References Cited

U.S. PATENT DOCUMENTS

| 6,179,409 B1 | 1/2001 | Takahashi | |
|---|---|---|---|
| 2004/0196496 A1* | 10/2004 | Klassen | 358/1.15 |
| 2004/0196497 A1* | 10/2004 | Klassen et al. | 358/1.15 |
| 2007/0070403 A1* | 3/2007 | Toda et al. | 358/1.15 |
| 2009/0033986 A1* | 2/2009 | Himpe | 358/1.15 |

FOREIGN PATENT DOCUMENTS

| JP | A-5-201077 | 8/1993 |
|---|---|---|
| JP | A-11-259644 | 9/1999 |
| JP | A-2000-335022 | 12/2000 |
| JP | A-2008-015605 | 1/2008 |

* cited by examiner

*Primary Examiner* — Ngon Nguyen
(74) *Attorney, Agent, or Firm* — Oliff & Berridge, PLC (57) ABSTRACT

A print-document conversion apparatus includes a conversion-module activation section that activates, as a process, a conversion module for performing conversion processing for converting print-document data which is described in a page description language and which includes units of processing into print-image data. The conversion module includes a thread activation part, an assigning part, and a shared cache. The thread activation part activates conversion processing threads. The assigning part assigns the units of processing to the conversion processing threads, and causes the conversion processing threads to perform processing on the units of processing. The shared cache is shared by the conversion processing threads. When a conversion result obtained by converting an object included in the units of processing is stored in the shared cache, each of the conversion processing threads obtains the stored conversion result instead of obtaining the conversion result by converting the object.

7 Claims, 8 Drawing Sheets

PRINT-DOCUMENT CONVERSION APPARATUS, PRINT-DOCUMENT CONVERSION METHOD, AND COMPUTER-READABLE MEDIUM STORING PROGRAM

CROSS-REFERENCE TO RELATED APPLICATIONS

This application is based on and claims priority under 35 USC 119 from Japanese Patent Application No. 2010-104999 filed Apr. 30, 2010.

BACKGROUND (i) Technical Field

The present invention relates to a print-document conversion apparatus, a print-document conversion method, and a computer-readable medium storing a program.

(ii) Related Art

Print data that is described in a page description language (PDL), such as PostScript® or Portable Data Format (PDF) specified in ISO 32000-1, is converted into a raster image (a bitmap image) by a conversion module called a raster image processor (RIP), and is printed by a printer. Because the conversion module needs to perform language processing in which a PDL is interpreted, the conversion module is typically realized by software. Furthermore, in addition to a scheme in which PDL data is directly converted into a raster image, a system that performs two-step conversion has also been well known. The two-step conversion includes the following: converting PDL data into intermediate-language data, such as display lists, which can achieve a granularity lower than a granularity achieved by PDL commands, and buffering the intermediate-language data; and converting the buffered intermediate-language data into a raster image.

Hitherto, a system has also been known, which performs conversion of PDL data into a raster image or intermediate-language data in parallel using multiple conversion modules in predetermined units, such as in units of pages.

Furthermore, hitherto, omitting of conversion processing has also been performed as follows: when conversion processing is performed to convert PDL commands into a raster image or intermediate-language data, data regarding a result of the conversion processing is cached so that the data is associated with identification information concerning the PDL commands; and, when the PDL commands are utilized later, the cached data is used, thereby omitting conversion processing.

Hitherto, multiple conversion modules that operate in parallel have been executed, on a computer, as individual processes different from one another. When multiple conversion modules that are to be caused to operate in parallel are activated, on a computer, as individual processes different from one another, memory spaces different from one another are assigned to the individual processes. Accordingly, a cache is typically managed for each process.

In a case in which each of multiple processes that operate in parallel individually manages a cache, even when a processing result (conversion result) of processing a command that a certain first process attempts to process exists in the cache of a second process that is another process, the first process cannot use the processing result that exists in the cache of the second process having a memory space which is different from a memory space of the first process. Accordingly, the cache utilization efficiency is reduced, compared with a cache utilization efficiency in a case in which PDL data that is a conversion target is converted by a single conversion module so that the pieces of the PDL data are sequentially converted in order from the first piece of the PDL data without being subjected to parallel processing.

In order to increase the cache utilization efficiency, a scheme for achieving sharing of a cache among the multiple processes is also considered. However, in this scheme, a process for managing the shared cache is necessary, so that loads are imposed on resources such as memories of a computer. Furthermore, in order that individual conversion processing processes for converting print data read/write data from/into the shared cache, process-to-process communication is necessary. Accordingly, the performance of each of the conversion processing processes is reduced because of a load imposed by the process-to-process communication or the like.

SUMMARY

According to a first aspect of the invention, there is provided a print-document conversion apparatus including a conversion-module activation section that is provided using a computer having a multi-central processing unit and that activates, as a process, a conversion module for performing conversion processing for converting print-document data which is described in a page description language and which includes multiple units of processing into print-image data in a bitmap image format or an intermediate-language format. The conversion module includes a thread activation part, an assigning part, and a shared cache. The thread activation part activates multiple conversion processing threads for converting the multiple units of processing included in the print-document data into print-image data in the bitmap image format or the intermediate-language format. The assigning part assigns the multiple units of processing included in the print-document data to the multiple conversion processing threads which have been activated by the thread activation part, and causes the multiple conversion processing threads to perform processing on the multiple units of processing. The shared cache is shared by the multiple conversion processing threads. When a conversion result that has been obtained by converting an object included in the multiple units of processing, which have been assigned, into the bitmap image format or the intermediate-language format is stored in the shared cache, each of the multiple conversion processing threads obtains the conversion result stored in the shared cache instead of obtaining the conversion result by converting the object.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described with reference to the accompanying drawings. In each of the figures, elements that are the same as or similar to each other are designated by the same reference numerals.

First, an example of a printing system in which an apparatus according to the exemplary embodiment is implemented will be described with reference to FIG. 1. The printing system includes a print-data conversion apparatus 100, a host computer 140, a print control apparatus 160, and a printer engine 170.

The print-data conversion apparatus 100 is an apparatus that converts print-document data, which is described in a PDL, into print-image data, such as raster images, which can be handled by the printer engine 170. The host computer 140 transmits print-document data to the print-data conversion apparatus 100 via a network, such as a local area network (LAN) 130, and provides an instruction for printing the print-document data.

The print-data conversion apparatus 100 includes a controller 110. The controller 110 includes a communication control section 112, a multi-CPU 114, a local memory 116, a second storage device 118, and a communication control section 120, which are connected so as to be capable of communicating with each other via a local bus 122. The communication control section 112 is a section that performs data communication with the host computer 140 via the LAN 130. The communication control section 112, for example, receives a print instruction and print-document data from the host computer 140, or transmits/receives, between the communication control section 112 and the host computer 140, information for control of printing. The multi-CPU 114 is a processor package into which multiple CPU cores are incorporated. The local memory 116 is a first storage that the individual CPU cores of the multi-CPU 114 use, for example, as a work area, and is configured, for example, using a random-access memory. The second storage device 118 is a non-volatile storage device having a comparatively large capacity, such as a hard disk device or an electrically erasable programmable read-only memory (EEPROM), and stores a program that the multi-CPU 114 executes, print-document data that has been received from the host computer 140, and so forth. A control program in which function modules described below in the exemplary embodiment are described is stored, for example, in the second storage device 118, and is executed by the multi-CPU 114. The control program can be executed in parallel by the multiple CPU cores of the multi-CPU 114. The multi-CPU 114 executes the control program, thereby converting print-document data into print-image data of individual pages. The communication control section 120 is a section that performs data communication with the print control apparatus 160 via a network called an intrasystem net 150. In this example, the print-data conversion apparatus 100 and the print control apparatus 160 (and the printer engine 170) are connected to each other via the intrasystem net 150, thereby configuring one printing system. The print-image data of the individual pages that has been generated by processing performed by the multi-CPU 114 is transmitted to the print control apparatus 160 via the communication control section 120 and the intrasystem net 150.

Figure 1:
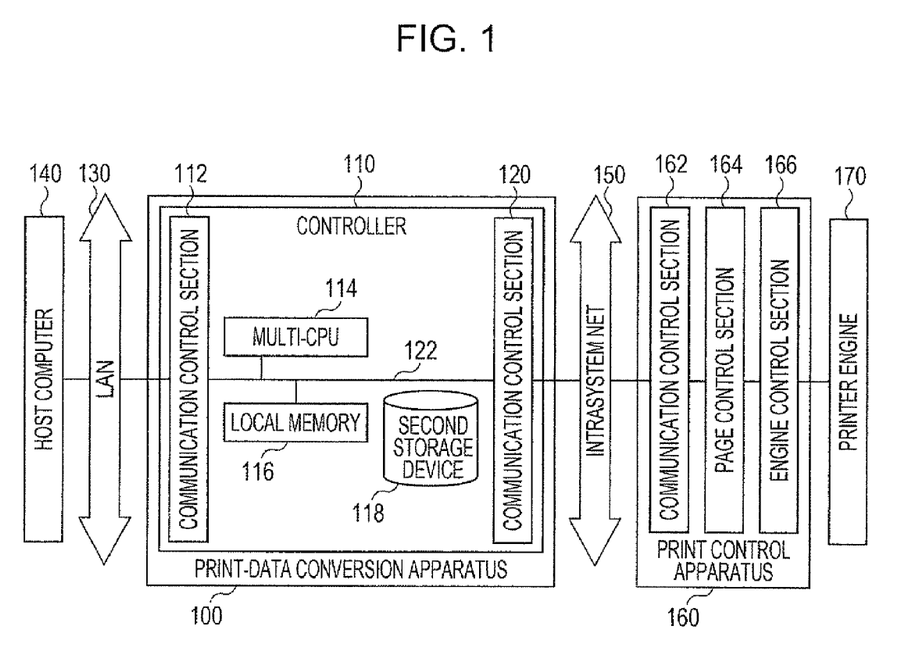
FIG. 1 is a diagram illustrating an example of a hardware configuration of a printing system in which an apparatus according to an exemplary embodiment is implemented.

The controller 110 may include a coprocessor, such as a graphic accelerator that performs image processing such as color space conversion, enlargement/reduction of an image, or image rotation at a high speed, although illustration of the coprocessor in FIG. 1 is omitted. In such a case, for example, a RIP processing program (a RIP module 300 described below) that is executed by the multi-CPU 114 requests the coprocessor to perform image processing, numeric data processing, or the like. The RIP processing program receives a processing result of the image processing, numeric data processing, or the like, and uses the processing result to generate print-image data of individual pages.

The printer engine 170 is printing hardware that prints an image represented by print-image data on a sheet using a color material such as ink and tanner. The print control apparatus 160 is an apparatus that controls the printer engine 170, and includes a communication control section 162, a page control section 164, and an engine control section 166. The communication control section 162 communicates with the print-data conversion apparatus 100 via the intrasystem net 150 to receive print-image data of individual pages or to transmit/receive various types of control information necessary for control of printing. The page control section 164 stores the received print-image data of the individual pages, and transmits the print-image data of the individual pages to the engine control section 166 in an order in which the pages are to be printed. The engine control section 166 supplies the received print-image data of the pages to the printer engine 170. The printer engine 170 prints the received print-image data on sheets.

Figure 2:
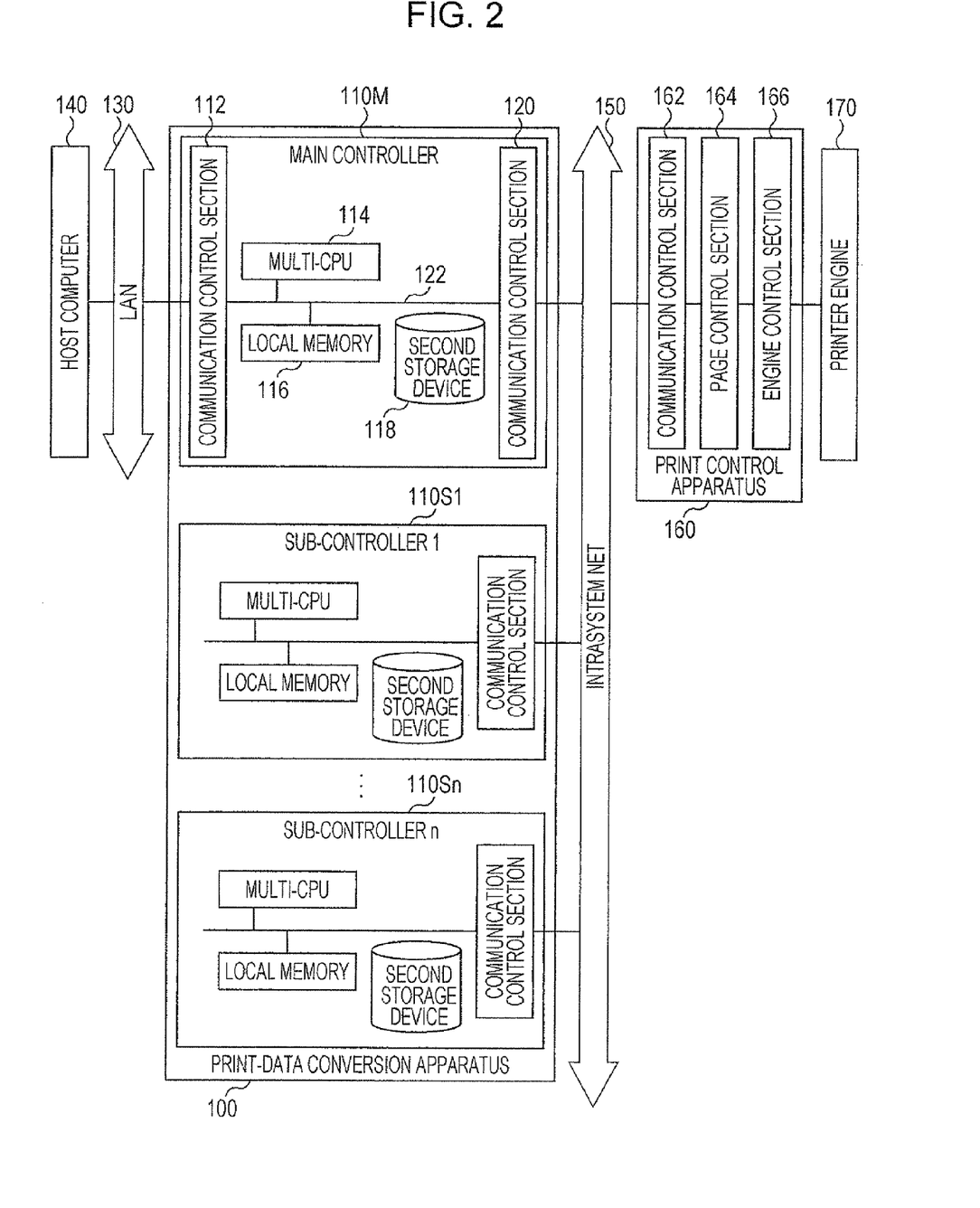
FIG. 2 is a diagram illustrating another example of the hardware configuration of the printing system in which an apparatus according to the exemplary embodiment is implemented, and which includes multiple controllers.

Another example of the printing system in which an apparatus according to the exemplary embodiment is implemented is illustrated in FIG. 2. In the example illustrated in FIG. 2, a print-data conversion apparatus 100 includes multiple controllers 110. The multiple controllers 110 share conversion processing in which multiple pages that are included in print-document data are converted, and perform the conversion processing in parallel. In the example, one of the multiple controllers 110 is a main controller 110M. The main controller 110M receives print-document data supplied from the host computer 140 using a communication control section 112, and performs control of assigning individual pages included in the print-document data to n sub-controllers 110S1 to 110Sn. The main controller 110M may include hardware and software that are similar to those of the controller 110 in the example illustrated in FIG. 1 except that the main controller 110M includes a function module for assigning pages. Each of the sub-controllers 110S1 to 110Sn may include hardware and software that are similar to those of the main controller 110M except that the sub-controller does not need a mechanism (for example, the communication control section 112) for communicating with the host computer 140. In one implementation example, the main controller 110M is configured as a mother board of a computer device constituting the print-data conversion apparatus 100, and the individual sub-controllers 110S1 to 110Sn are configured as add-on boards that can be connected to the mother board. In this implementation example, the print-data conversion apparatus 100 is scalable, and can change the processing speed of the print-data conversion apparatus 100 in accordance with the number of sub-controllers that are additionally provided.

Also in the example illustrated in FIG. 2, a coprocessor for image processing or the like may be incorporated into each of the main controller 110M and the sub-controllers 110S1 to 110S$n$.

Next, an example of a function module configuration of the print-data conversion apparatus 100 according to the exemplary embodiment will be described with reference to FIG. 3. The function module configuration illustrated in FIG. 3 is realized by performing the control program with the multi-CPU 114 of the controller 110.

Figure 3:
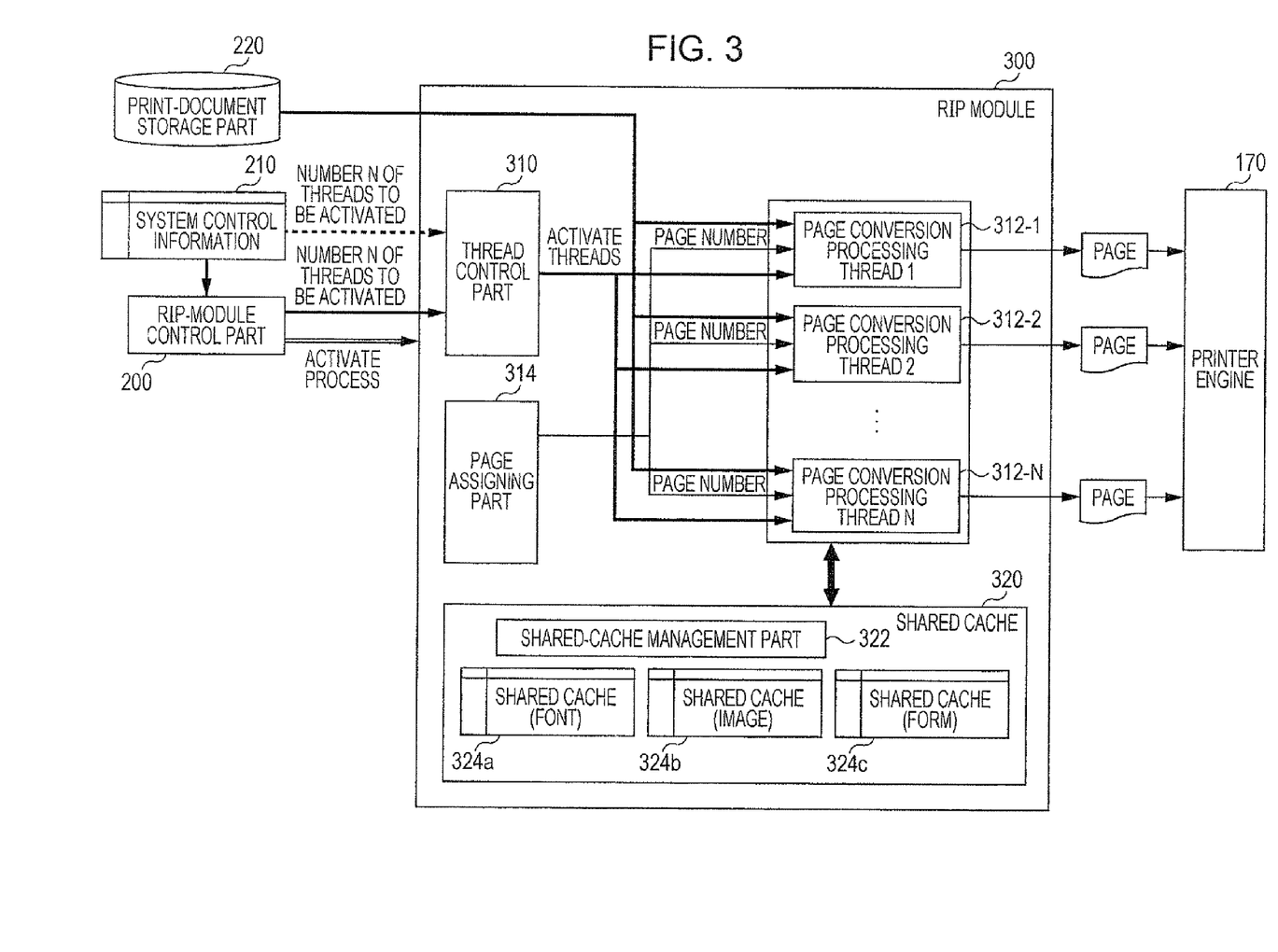
FIG. 3 is a functional block diagram illustrating an overall configuration of a print-data conversion apparatus according to the exemplary embodiment.

In FIG. 3, a RIP-module control part 200 performs control of activating the RIP module 300. In the example, the RIP-module control part 200 activates the RIP module 300 as one process. The RIP-module control part 200 can be realized, for example, by executing program code included in control program with the multi-CPU 114. The program code may be a program representing processing in which a process is generated, and in which a function representing the RIP module 300 is called by the process.

System control information 210 is control information that the RIP-module control part 200 uses for control, and includes, for example, information including a number N of page conversion processing threads 312 that are to be activated in the RIP module 300 and so forth. The RIP-module control part 200 may supply the number N to the RIP module 300 that has been generated. Alternatively, the RIP module 300 that has been generated may obtain the number N by referring to the system control information 210.

A print-document storage part 220 stores print-document data that has been received from the host computer 140 and that is described in a PDL. In the example, print-document data to be stored is data that is described in a PDL (for example, PDF) which is page independent and which does not include cache control commands. Here, being "page independent" means that information describing print-image data of a page is represented only by PDL data for the page and does not depend on PDL data for other pages. Note that PostScript is a PDL that is not page independent (i.e., is page dependent), and includes cache control commands.

The RIP module 300 is a software module that is in control of RIP processing in which print-document data is converted into print-image data such as raster images. In the exemplary embodiment, the RIP module 300 is activated as one process on the multi-CPU 114 by the RIP-module control part 200, and is executed. However, the RIP module 300 that is activated and executed as one process causes multiple page conversion processing threads 312-1, 312-2, ..., and 312-N to be run in the RIP module 300, thereby performing RIP processing for multiple pages in parallel using the individual page conversion processing threads 312-1, 312-2, ..., and 312-N.

For this reason, the RIP module 300 includes a thread control part 310 and a page assigning part 314. The thread control part 310 activates the N page conversion processing threads 312-1, 312-2, ..., and 312-N (hereinafter, collectively referred to as "page conversion processing threads 312" when the page conversion processing threads 312-1, 312-2, ..., and 312-N do not need to be distinguished from one another) in accordance with the number N that is defined in the system control information 210. For example, by running each of the page conversion processing threads 312 in the respective CPU cores of the multi-CPU 114, each of the page conversion processing threads 312 may occupy a corresponding one of the CPU cores, and may perform RIP processing. The configuration for executing the page conversion processing threads 312 is not limited thereto. A configuration in which at least one of the CPU cores executes at least two of the page conversion processing threads 312 may be used. Note that the thread control part 310 and the page assigning part 314 are executed by one of the CPU cores included in the multi-CPU 114.

The page assigning part 314 assigns different pages included in print-document data to the individual page conversion processing threads 312. A manner for assigning pages is not particularly limited thereto. For example, the manner for assigning pages may be a fixed manner in which pages are sequentially assigned to the page conversion processing threads 312 in order from the top page in accordance with the numbers of the page conversion processing threads 312. Alternatively, the manner for assigning pages may be a dynamic manner in which pages are sequentially assigned to the page conversion processing threads 312 in the order in which the page conversion processing threads 312 finish conversion processing in which pages are converted. Assignment of pages may be performed, for example, by notifying the page conversion processing threads 312 of page numbers corresponding to pages, which are assignment targets, from the page assigning part 314.

Each of the page conversion processing threads 312 converts, out of print-document data stored in the print-document storage part 220, data for a page corresponding to a page number that has been specified by the page assigning part 314 into print-image data. In other words, the page conversion processing thread 312 interprets PDL data for a page corresponding to a specified page number so that the pieces of the PDL data are sequentially interpreted in order from the first piece of the PDL data, and renders (rasterizes) the PDL data on a page image memory, thereby generating print-image data of the page. Note that, in a case in which print-document data is print-document data in the PDF format, the print-document data includes index information concerning PDL data for each page that is included in the print-document data. By referring to the index information included in the print-document data stored in the print-document storage part 220, each of the page conversion processing threads 312 may obtain PDL data for a page corresponding to the page number that has been specified by the page assigning part 314.

When each of the page conversion processing threads 312 detects a render command for rendering an image object such as a font, an image, or a form while the page conversion processing thread 312 is interpreting the PDL data so that the pieces of the PDL data are sequentially interpreted in order from the piece of the PDL data for the beginning of the page, the page conversion processing thread 312 makes an inquiry to a shared-cache management part 322 as to whether or not the image object is cached in a shared cache 320 before the page conversion processing thread 312 performs rendering processing corresponding to the render command. The shared-cache management part 322 checks whether or not conversion-result data (print-image data) that is obtained by converting the image object, regarding which the shared-cache management part 322 has made an inquiry, is cached in individual shared caches 324$a$ to 324$c$ for fonts, images, forms, and so forth.

As a result, when the conversion-result data is cached, the shared-cache management part 322 returns the conversion-result data to the page conversion processing thread 312. In this case, the page conversion processing thread 312 writes the print-image data, which has been returned from the shared-cache management part 322, as an image corresponding to the image object into the page image memory (not illustrated). In this case, the page conversion processing thread 312 does not need to perform the render command.

In contrast, when the image object that is attempted to be rendered is not cached in the shared cache 320, the shared-cache management part 322 returns a reply saying so to the page conversion processing thread 312. The page conversion processing thread 312 that has received the reply performs the render command, thereby converting the image object described in the PDL into print-image data, and writes the print-image data into the page image memory. Then, the page conversion processing thread 312 requests the shared-cache management part 322 to cache the print-image data, which has been obtained as conversion-result data, so that the print-image data is associated with identification information concerning the image object. As the identification information concerning the image object, for example, a hash or the like of attribute information concerning the image object (for example, a combination of a type of object, a data size, and so forth, the combination being represented, for example, by the render command for providing an instruction for rendering the image object and by an argument for the render command) may be used. However, the identification information concerning the age object is not limited to the hash of the attribute information concerning the image object. An inquiry from the page conversion processing thread 312 to the shared-cache management part 322 is made, for example, by presenting the identification information. The shared-cache management part 322 may search the shared caches 324a to 324c using the identification information that has been presented.

The page conversion processing thread 312 is realized, for example, by activating a thread with the thread control part 310, and by calling, in the thread, a function (program) in which a feature such as the above-described feature is described.

Note that, in a configuration in which a coprocessor such as a graphic accelerator is incorporated into the controller 110, the page conversion processing thread 312 may request the coprocessor to perform a portion of processing (for example, image processing such as color space conversion) that is being performed by the page conversion processing thread 312.

The shared-cache management part 322 is a module that manages the shared caches 324a to 324c, and reads/writes data from/into the shared caches 324a to 324c in accordance with requests from the page conversion processing threads 312. The shared-cache management part 322 is implemented, for example, as a thread or a library routine in the RIP module 300. Note that, in the example illustrated in FIG. 3, in order to improve search performance and so forth, the shared caches are classified in accordance with the type of object such as a font, an image, or a form, and are managed. However, another management manner may also be considered.

Because each of the page conversion processing threads 312 (and the shared-cache management part 322) is a thread (or a library routine) implemented in the RIP module 300 that is activated and executed as one process, the page conversion processing threads 312 (and the shared-cache management part 322) share a memory space. Accordingly, the individual page conversion processing threads 312 (and the shared-cache management part 322) can share cached data via the shared caches 324a to 324c without performing process-to-process communication.

When each of the page conversion processing threads 312 finishes conversion processing in which PDL data for one page is converted, the page conversion processing thread 312 supplies print-image data of the page, which has been formed on the page image memory, to the printer engine 170 via the print control apparatus 160 (omitted in FIG. 3).

As described above, in the exemplary embodiment, conversion-result data that is obtained by converting objects included in pages which all of the page conversion processing threads 312 have been in charge of is cached in the shared cache 320. Because the conversion-result data that has been cached is reused in all of the page conversion processing threads 312, the cache utilization efficiency is high. Furthermore, the individual page conversion processing threads 312 cache conversion-result data in the shared cache 320, and the shared cache 320 shares the memory space with the multiple page conversion processing threads 312. Accordingly, without performing process-to-process communication that imposes a large CPU load, data can be cached in the shared cache 320, and cached data can be obtained.

Next, an example of a configuration of the printing system will be described with reference to FIG. 4.

In this example, a print-data conversion apparatus 100 includes a print-document receiving part 230 that receives print-document data from the host computer 140. Furthermore, a RIP module 300 that is activated as a process includes a page detection part 316. The page detection part 316 detects individual pages that are included in print-document data stored in a print-document storage part 220, and notifies a page assigning part 314 of the detected pages. In a case in which print-document data is in the PDF format, detection of pages may be performed with reference to index information concerning the pages included in the print-document data. The page assigning part 314 specifies page numbers corresponding to the pages that have been notified from the page detection part 316, and provides the specified page numbers for individual page conversion processing threads 312. Operations of the other function modules are similar to those in the example illustrated in FIG. 3. In FIG. 4, although illustration of modules such as system control information 210 and a communication control section 162 is omitted, the RIP module 300 and the print control apparatus 160 include the modules.

Next, an example of a functional configuration of a print-data conversion apparatus including multiple controllers will be described with reference to FIG. 5.

In this example, the print-data conversion apparatus includes three controllers 1 to 3. A configuration in which the number of controllers is three is only one example. The print-data conversion apparatus may include two, four, or more controllers.

Here, for example, it is supposed that the controller 1 and the remaining two controllers 2 and 3 correspond to the main controller 110M and two of the sub-controllers 110S1 to 110Sn, respectively, which are illustrated in FIG. 2. Each of multi-CPUs 114 of the individual controllers 1 to 3 executes a corresponding one of RIP-module control parts 200-1 to 200-3 and a corresponding one of RIP modules 300-1 to 300-3. Each of the RIP-module control parts 200-1 to 200-3 and each of the RIP modules 300-1 to 300-3 have function modules that are similar to those of the RIP-module control part 200 and the RIP module 300 that are illustrated in FIG. 3 or 4 as examples.

Only the controller 1 serving as a main controller may include a print-document storage part 220 and a print-document receiving part 230. Furthermore, the controller 1 serving as a main controller has a page detection part 240 and a page specifying part 242. As in the case of the page detection part 316 included in the RIP module 300 described above (see FIG. 4), the page detection part 240 detects individual pages included in print-document data stored in the print-document storage part 220. As in the case of the page assigning part 314 included in the RIP module 300 described above (see FIG. 4), the page specifying part 242 assigns the individual pages, which have been detected by the page detection part 240, to the individual controllers 1 to 3. In other words, the page specifying part 242 transmits identification information (for example, page numbers) concerning the detected pages to page queues 202-1 to 202-3 of the controllers 1 to 3. A manner for assigning pages to the controllers 1 to 3 may be a fixed manner in which pages are sequentially assigned to the controllers 1 to 3 in order from the top page in accordance with the numbers of the controllers 1 to 3. Alternatively, the manner for assigning pages to the controllers 1 to 3 may be a dynamic manner in which, every time a page queue among the page queues 202-1 to 202-3 of the respective controllers 1 to 3 is available, identification information concern g a page is assigned to the page queue. Furthermore, the page specifying part 242 may also preferentially assign a page to a page queue holding the smallest number of pages among the page queues 202-1 to 202-3.

Each of the controllers 1 to 3 has a corresponding one of the page queues 202-1 to 202-3 that hold identification information (for example, page numbers) concerning pages which have been specified by the page specifying part 242 and which are processing targets. Each of the page queues 202-1 to 202-3 holds a predetermined number of pieces of identification information concerning pages using a last-in first-out scheme.

Each of page assigning parts 314-1 to 314-3 included in the respective controllers 1 to 3 obtains the identification information concerning the pages that is held by a corresponding one of the page queues 202-1 to 202-3 so that the pieces of the identification information are sequentially obtained in order from the first piece of the identification information, and assigns the pages to individual page conversion processing threads 312.

As described above, in the example illustrated in FIG. 5, a two-step configuration is employed, in which the page specifying part 242 that is executed by the controller 1 serving as a main controller distributes pages to the RIP modules 300-1 to 300-3 of the respective controllers 1 to 3, and in which each of the page assigning parts 314-1 to 314-3 included in the respective RIP modules 300-1 to 300-3 distributes the pages, which have been assigned to the page assigning part, to the multiple page conversion processing threads 312 included in the RIP module. Note that, in this configuration, because individual pages included in print-document data have already been detected by the page detection part 240, the functions of page detection parts 316-1 to 316-3 included in the respective RIP modules 300-1 to 300-3 are not used. Accordingly, in the configuration illustrated in FIG. 5, the RIP modules 300-1 to 300-3 do not necessarily need to have the page detection parts 316-1 to 316-3. Furthermore, a setting for disabling the functions of the page detection parts 316-1 to 316-3 included in the RIP modules 300-1 to 300-3 may be set.

Figure 5:
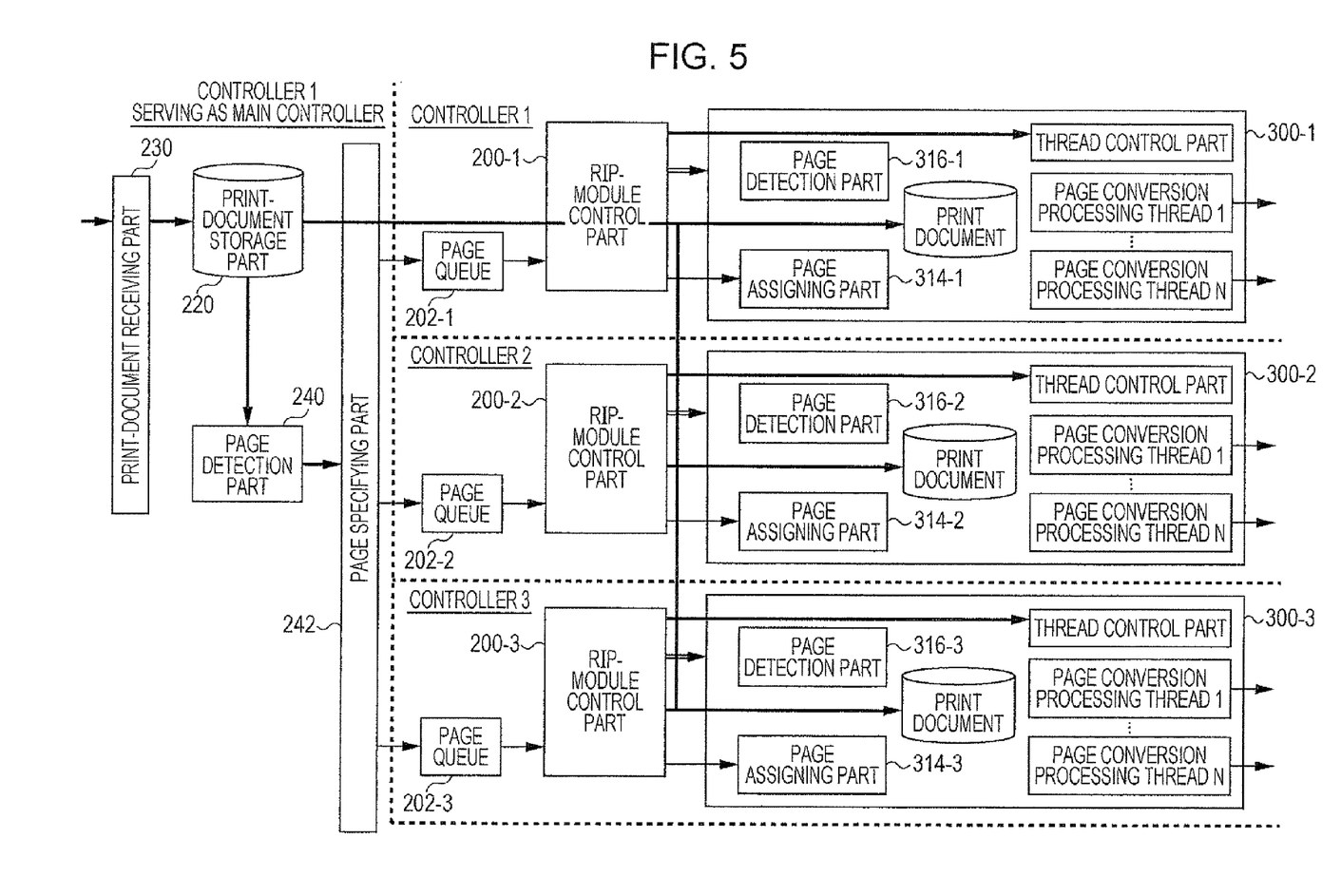
FIG. 5 is a functional block diagram illustrating an example of a print-data conversion apparatus including multiple controllers.

Note that the two-step configuration illustrated in FIG. 5 can be applied to a case in which only one controller is used.

Additionally, in the configuration illustrated in FIG. 5, the page queues 202-1 to 202-3 included in the controllers 1 to 3 are provided outside the RIP modules 300-1 to 300-3. However, the page queues 202-1 to 202-3 may be provided inside the RIP modules 300-1 to 300-3.

Note that, in the above description about the configuration illustrated in FIG. 5, the controller 1 includes the print-document storage part 220 and the print-document receiving part 230. However, the configuration is only one example. Instead of the configuration, for example, a configuration may be used, in which a CPU that performs overall control of the print-data conversion apparatus and that is provided on a mother board manages the print-document storage part 220 and the print-document receiving part 230, and in which individual pages are distributed to the individual controllers 1 to 3 that are additionally provided on the mother board.

Figure 6:
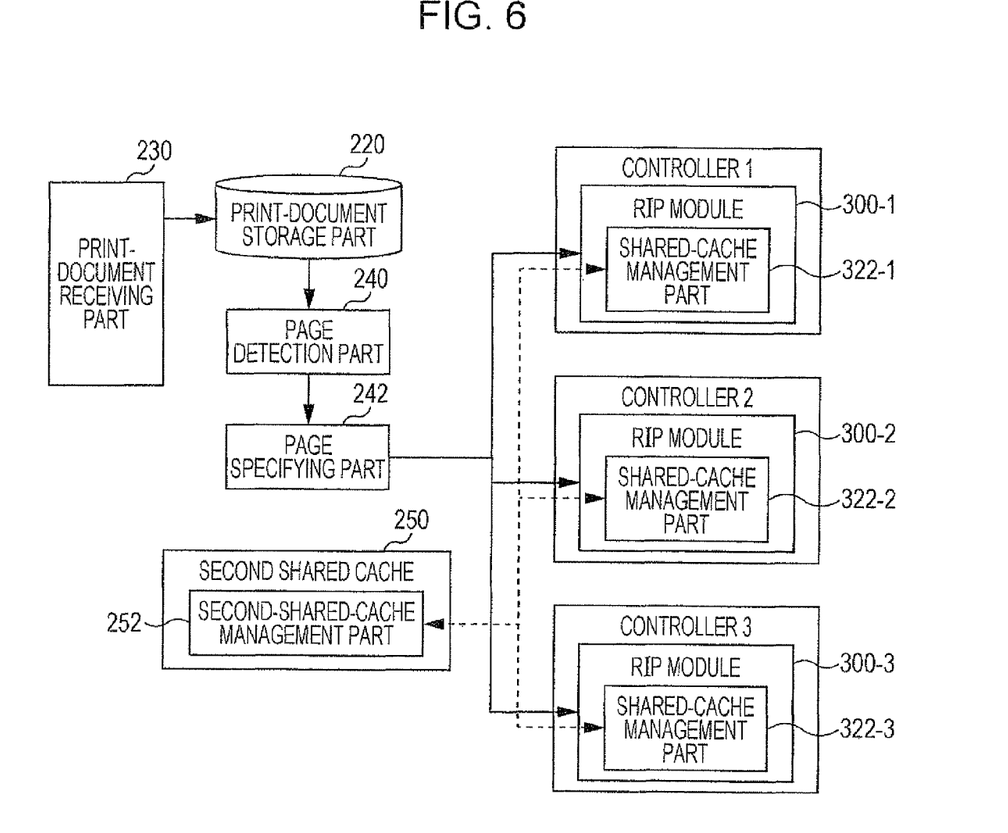
FIG. 6 is a diagram illustrating an example of a print-data conversion apparatus that is obtained by providing a second shared cache which is shared by the multiple controllers in the print-data conversion apparatus illustrated in FIG. 5.

In the configuration illustrated in FIG. 5, a shared cache 320 included in each of the RIP modules 300-1 to 300-3 included in the respective controllers 1 to 3 is shared by the page conversion processing threads 312 included in the RIP module, although illustration of the shared cache 320 is omitted. Accordingly, the individual page conversion processing threads 312 that are run in each of the controllers 1 to 3 cannot utilize objects that exist in the shared caches 320 included in the other controllers. For this reason, as illustrated in FIG. 6, a second shared cache 250 shared by the individual controllers 1 to 3 may be provided. A second-shared-cache management part 252 that manages the second shared cache 250 is executed as a process by one of the CPUs of the controllers 1 to 3 or the main CPU of the print-data conversion apparatus. Regarding each of shared-cache management parts 322-1 to 322-3 included in the RIP modules 300-1 to 300-3 of the respective controllers 1 to 3, when an object regarding which one of the page conversion processing threads 312 has made an inquiry to the shared-cache management part does not exist in the shared cache 320 that the shared-cache management part manages, the shared-cache management part makes an inquiry to the second-shared-cache management part 252 as to whether or not the object exists. If the object exists in the second shared cache 250, the second-shared-cache management part 252 supplies the object to the shared-cache management part 322 that has made an inquiry as to the object. Furthermore, when each of the shared-cache management parts 322-1 to 322-3 is requested from one of the page conversion processing threads 312 to cache conversion-result data that is obtained by converting an object, the shared-cache management part caches the conversion-result data in the shared cache 320 that the shared-cache management part manages. Additionally, the shared-cache management part transmits the same conversion-result data to the second-shared-cache management part 252 using a write-through scheme or a write-back scheme, and causes the second-shared-cache management part 252 to cache the conversion-result data.

Next, a modification example of the exemplary embodiment will be described with reference to FIG. 7.

Figure 7:
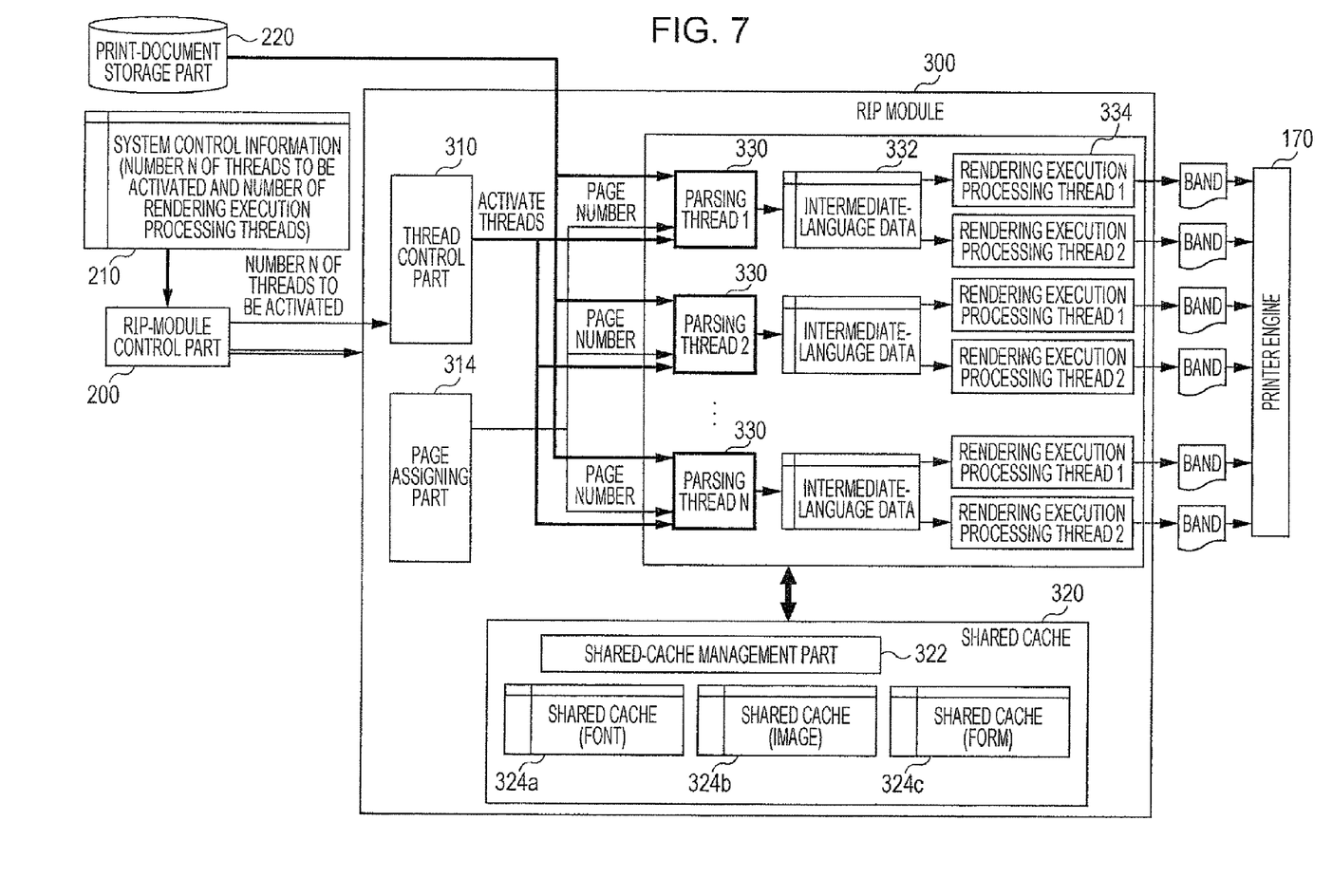
FIG. 7 is a functional block diagram illustrating an overall configuration of a print-data conversion apparatus according to a modification example.

In the modification example illustrated in FIG. 7, the page conversion processing threads 312 in the examples illustrated in FIGS. 3 to 6 are divided into parsing threads 330 and rendering execution processing threads 334. In other words, in the exemplary embodiment, the page conversion processing threads 312 perform both processing in which PDL data is parsed and in which the PDL data is converted into intermediate-language data such as display lists, and processing in which raster images are rendered using the intermediate-language data. However, in the modification example, parsing and rendering processing are separately performed by different threads.

Multiple rendering execution processing threads 334 (two rendering execution processing threads 334 in the example illustrated in FIG. 7) may be run for each of the parsing threads 330. A number N of parsing threads 330 that a thread control part 310 activates and the number of rendering execution processing threads 334 that are activated for each of the parsing threads 330 may be set in system control information 210.

In the modification example, parsing may be performed in units of pages, and rendering processing may be performed using division into bands. In other words, one of the parsing threads 330 performs parsing for one page, and the rendering execution processing threads 334 corresponding to the parsing thread 330 perform rendering processing for individual bands included in the page. For example, one of the parsing threads 330 may convert PDL data to generate intermediate-language data 332 of each band. Each of the rendering execution processing threads 334 may read the intermediate-language data 332 of each band, and may perform rendering. Note that a band is a region in a strip shape that is obtained by dividing a page into regions each of which includes a predetermined number of lines in a sub-scanning direction. The number of rendering execution processing threads 334 corresponding to each of the parsing threads 330 does not necessarily need to correspond to the number of divisions that is used to divide a page into bands. For example, one page may be divided into eight bands, and the eight bands may be sequentially processed in parallel by two of the rendering execution processing threads 334. The rendering execution processing threads 334 may request a coprocessor such as a graphic accelerator to perform a portion of or all of rendering processing in which the intermediate-language data 332 is rendered.

In the modification example illustrated in FIG. 7, a shared cache 320 is shared by all of the parsing threads 330 and all of the rendering execution processing threads 334 included in a RIP module 300. In other words, intermediate-language data that is conversion-result data obtained by converting PDL data, and print-image data that is conversion-result data obtained by converting the intermediate-language data are cached in the shared cache 320. In the shared cache 320, for example, intermediate-language data representing an image object that is defined using PDL commands is registered by each of the parsing threads 330 so that the intermediate-language data is associated with identification information concerning the image object. Furthermore, in the shared cache 320, print-image data representing an image object that is defined using commands for intermediate-language data is registered by each of the rendering execution processing threads 334 so that the print-image data is associated with identification information concerning the image object. Before each of the parsing threads 330 analyses PDL data representing a certain object, the parsing thread 330 makes an inquiry as to whether or not intermediate-language data representing the same object exists in the shared cache 320. If the intermediate-language data exists in the shared cache 320, the parsing thread 330 reads and uses the intermediate-language data. Similarly, if print-image data representing a certain object exists in the shared cache 320, each of the rendering execution processing threads 334 also reads and uses the cached print-image data instead of performing rendering processing.

Figure 8:
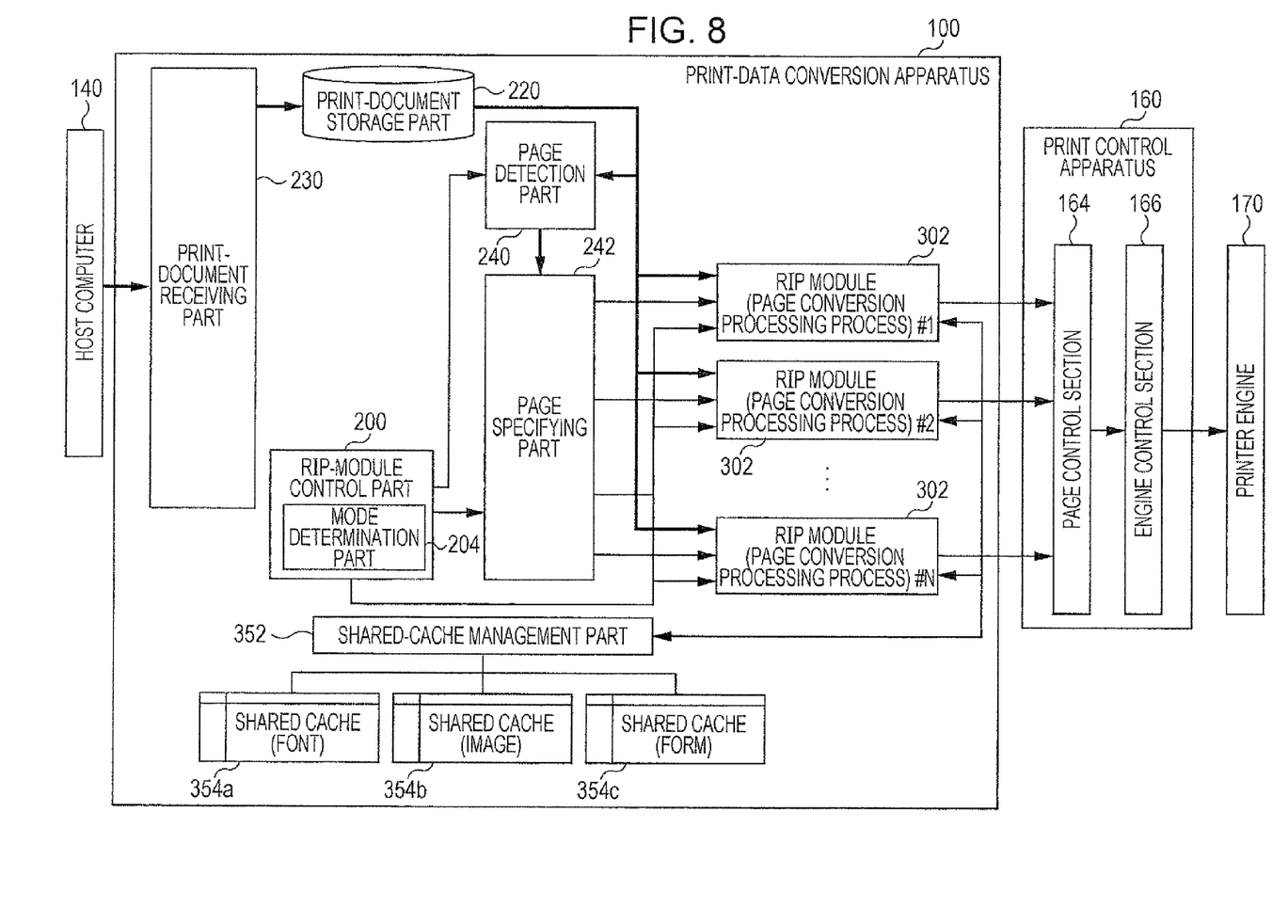
FIG. 8 is a functional block diagram illustrating an example of a print-data conversion apparatus having a function of switching between modes for parallel processing.

The exemplary embodiment and the modification example given above are examples in which print-document data is described in a PDL not including cache control commands (for example, PDF). In contrast, in a case in which print-document data is described in a PDL including cache control commands, such as PostScript, a print-data conversion apparatus 100 employs a scheme in which multiple RIP modules 302 are executed as illustrated in FIG. 8, instated of the above-described scheme in which the multiple page conversion processing threads 312 are executed in the RIP module 300 that is executed as one process. As in the case of each of the page conversion processing threads 312 in the above-described examples, each of the RIP modules 302 converts PDL data for an assigned page into print-image data, and does not include the thread control part 310, the page assigning part 314, and so forth that are included in each of the RIP modules 300 in the above-described examples. The difference between each of the page conversion processing threads 312 in the above-described examples and each of the RIP modules 302 in the example illustrated in FIG. 8 is that the page conversion processing thread 312 is executed as a thread and that, in contrast, the RIP module 302 is executed as a process. Accordingly, the individual RIP modules 302 perform processing in memory spaces that are different from one another.

Figure 4:
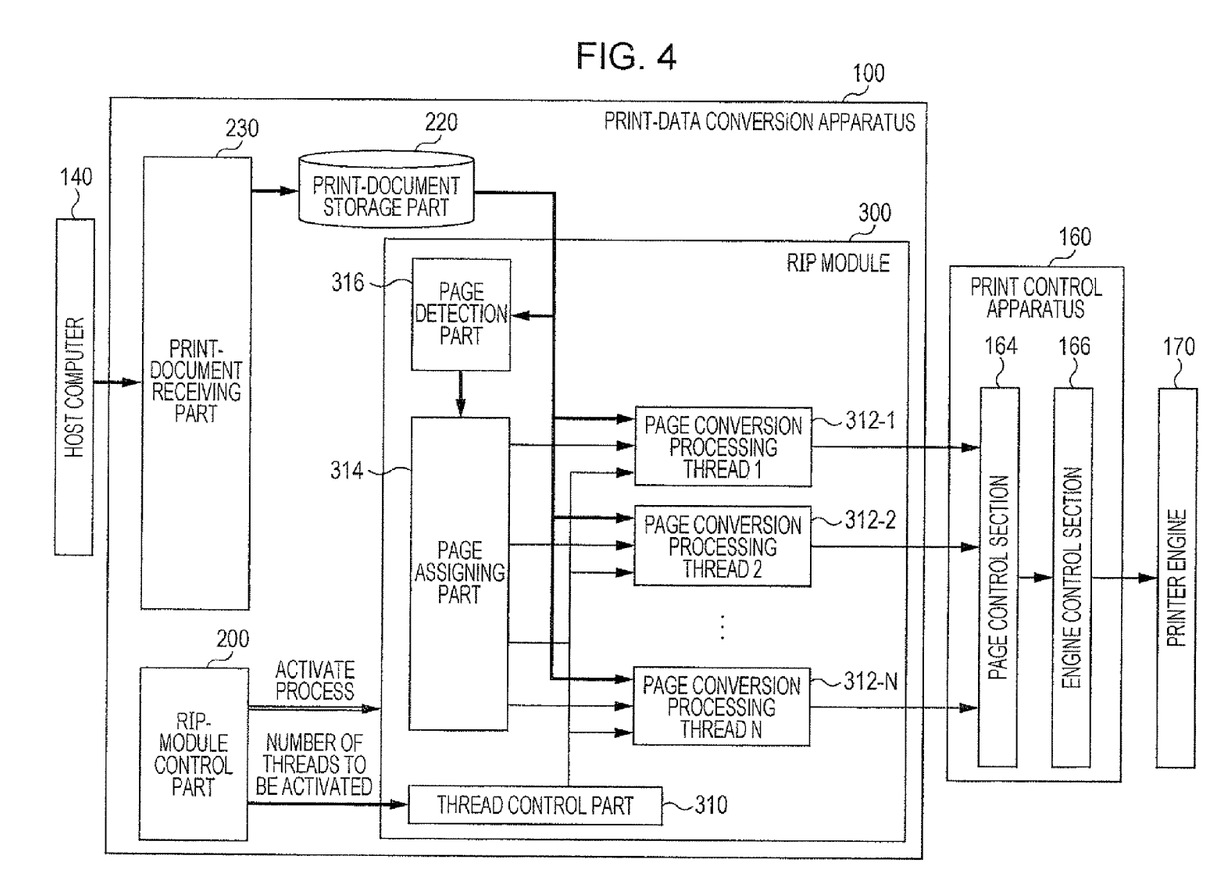
FIG. 4 is a functional block diagram illustrating an example of a functional configuration of the printing system in the exemplary embodiment.

The functions of a print-document storage part 220 and a print-document receiving part 230 may be similar to those in the above-described examples (for example, see FIGS. 3 to 5). In a case in which print-document data is described in a page-dependent PDL such as Postscript, a page detection part 240 performs idle reading processing in which the pieces of the print-document data are sequentially read in order from the first piece of the print-document data (processing in which only parsing or the like that is necessary for detection of page delimiters is performed without performing rendering processing or the like), thereby detecting pages. Furthermore, the page detection part 240 may simply generate page numbers without performing such analysis, and may supply the page numbers to a page specifying part 242. The page specifying part 242 assigns the pages, which have been detected by the page detection part 240, to the individual RIP modules 302.

In a case in which print-document data is described in a page-dependent PDL, in one example, each of the RIP modules 302 sequentially parses the assigned pieces of the print-document data in order from the first assigned piece of the print-document data to obtain an analysis result, and updates the internal state (for example, variables defining environments and conditions for rendering, or print resources such as fonts that are held) of the RIP module 302 in accordance with the analysis result. In this case, regarding pages other than the pages that have been assigned to each of the RIP modules 302, the RIP module 302 does not perform rendering processing for the pages, and performs only parsing for the pages. Regarding the pages that have been assigned to the RIP module 302 by the page specifying part 242, the RIP module 302 performs not only such parsing but also rendering processing for the pages. Note that each of the RIP modules 302 may perform, for the pages other than the pages that have been assigned to the RIP module 302, parsing on only PDL commands that change the internal state of the RIP module 302 (for example, see paragraph 0043 of Japanese Unexamined Patent Application Publication No 2008-015605 filed by the inventor of the present invention).

Each of the RIP modules 302 may has a first cache that is specific to the RIP module 302 in the memory space of the RIP module 302, although illustration of the first cache is omitted in FIG. 8. For example, even in a case in which a cache control command is included in print-document data, only the specific first cache included in one of the RIP modules 302 is controlled by the cache control command, and does not influence the first caches included in the other RIP modules 302.

Here, when the multiple RIP modules 302 operate in parallel, there is a case in which a subsequent page to a certain page is processed before the certain page is processed. In such a case, for example, if a RIP module 302 that is one of the RIP modules 302 and that is to process the certain page refers to a cache in which a processing result of processing the subsequent page is reflected, it is impossible to correctly perform RIP processing. However, in the example illustrated in FIG. 8, because each of the RIP modules 302 refers to the first cache of the RIP module 302, such a problem does not occur.

Furthermore, in the example illustrated in FIG. 8, shared caches 354a to 354c that are shared by the multiple RIP modules 302 may be provided in the print-data conversion apparatus 100. In the example illustrated in FIG. 8, the shared caches 354a, 354b, and 354c are provided to be used for fonts, images, and forms, respectively. However, separate management of each cache as described above is not necessarily necessary. The shared caches 354a to 354c are second (second-level) caches when recognized with respect to the first caches included in the individual RIP modules 302.

The shared caches 354a to 354c are managed by a shared-cache management process 352. When conversion of an object represented by PDL data into a print image is performed by each of the RIP modules 302, the RIP module 302 checks whether or not conversion-result data obtained by converting the object is cached in the first cache included in the RIP module 302. When the conversion-result data is cached, the conversion-result data that is cached is used instead of converting (performing RIP processing on) the PDL data representing the object. Furthermore, when the conversion-result data obtained by converting the object is not cached in the first cache, the RIP module 302 makes an inquiry to the shared-cache management process 352 using process-to-process communication as to whether or not the conversion-result data obtained by converting the object is cached in the shared caches 354a to 354c. Then, if the conversion-result data is cached, the RIP module 302 obtains and utilizes the conversion-result data that is cached. Moreover, when the conversion-result data obtained by converting the object is not cached also in the shared caches 354a to 354c, the RIP module 302 converts the object, and caches conversion-result data in the first cache and the shared caches 354a to 354c.

Here, in a case in which print-document data is described in PostScript, even when the same command is performed, if the internal states of the RIP module 302 at times at which the same command is performed are different from each other, images different from each other are generated (or, when the RIP module 302 has an inappropriate internal state, rendering is impossible). Accordingly, when the RIP module 302 attempts to convert a certain object, it is supposed that conversion-result data obtained by converting the object is cached in the first cache or the shared caches 354a to 354c. Even in this case, if an internal state of the RIP module 302 at the present point in time (at a point in time when the RIP module 302 attempts to convert the object) is different from an internal state of the RIP module 302 at a point in time when the conversion-result data, which is cached, was generated, a correct image cannot be generated using the conversion-result data that is cached.

For this reason, in the example illustrated in FIG. 8, when caching of the conversion-result data in the first cache and the shared caches 354a to 354c is performed, the conversion-result data is registered in the first cache and the shared caches 354a to 354c so that the conversion-result data is associated with identification information in which the internal state of the RIP module 302 at the point in time when the conversion-result data was generated is reflected. For example, identification information is generated using a method in which a hash of information including not only a command for providing an instruction for rendering the object and an argument for the command but also an internal state of a RIP module at a point in time when the command is performed is obtained. Then, when the RIP module 302 performs conversion of the object represented by PDL data into print-image data, the RIP module 302 may generate identification information from a command for providing an instruction for rendering the object, an argument for the command, and an internal state of the RIP module 302 at this point in time, and may search the first cache or the shared caches 354a to 354c for conversion-result data corresponding to the identification information.

Then, in the example illustrated in FIG. 8, a mode determination part 204 determines whether print-document data received from the host computer 140 is described in a PDL including cache control commands. In other words, the mode determination part 204 determines whether the print-document data is data described in PostScript (including cache control commands) or data described in PDF (not including cache control commands). The determination may be performed on the basis of a file identifier or header information included in the print-document data. Then, when it is determined that the print-document data is data described in a PDL including cache control commands, the RIP-module control part 200 activates each of the multiple RIP modules 302 as a process in a first mode as illustrated in FIG. 8. In contrast, when it is determined that the print-document data is data described in a PDL not including cache control commands, the RIP-module control part 200 activates the RIP module 300 as a process in a second mode, for example, as illustrated in FIG. 4, and activates the multiple page conversion processing threads 312-1 to 312-N in the RIP module 300. As described above, the print-data conversion apparatus 100 has a function of switching between modes for parallel processing, whereby the print-data conversion apparatus 100 can handle both print-document data described in PDLs including cache control commands and print-document data described in PDLs not including cache control commands.

In each of the above examples, the portions of conversion processing are assigned to the page conversion processing threads 312 or the RIP modules 302 in units of pages. However, the units for assignment are not limited to units of pages. Units other than units of pages, such as units of bands, may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print-document conversion apparatus comprising:
 a conversion-module activation section that is provided using a computer having a multi-central processing unit and that activates, as a process, a conversion module for performing conversion processing for converting print-document data, which is described in a page description language and which includes a plurality of units of processing, into print-image data in a bitmap image format or an intermediate-language format,
 the conversion module including
  a thread activation part that activates a plurality of conversion processing threads for converting the plurality of units of processing included in the print-document data into print-image data in the bitmap image format or the intermediate-language format, an assigning part that assigns the plurality of units of processing included in the print-document data to the plurality of conversion processing threads which have been activated by the thread activation part, and that causes the plurality of conversion processing threads to perform processing on the plurality of units of processing, and a shared cache that is shared by the plurality of conversion processing threads, wherein, when a conversion result that has been obtained by converting an object included in the plurality of units of processing, which have been assigned, into the bitmap image format or the intermediate-language format is stored in the shared cache, each of the plurality of conversion processing threads obtains the conversion result stored in the shared cache instead, of obtaining the conversion result by converting the object, and wherein each of the plurality of conversion processing threads, before converting the object included in the plurality of units of processing, inquires whether the object has previously been converted by the plurality of conversion processing threads and stored in the shared cache.

2. The print-document conversion apparatus according to claim 1, further comprising:

a first mode processing section that activates a plurality of conversion processing processes for converting the plurality of units of processing included in the print-document data into print-image data in the bitmap image format or the intermediate-language format, that activates an assignment process which assigns the plurality of units of processing included in the print-document data to the plurality of conversion processing processes which have been activated, that activates a cache management process which manages a second shared cache shared by the plurality of conversion processing processes, and that performs first mode processing in which each of the plurality of conversion processing processes performs process-to-process communication with the cache management process, and in which, when a conversion result obtained by converting an object included in the units of processing assigned to the conversion processing process into the bitmap image format or the intermediate-language format is stored in the second shared cache, the conversion processing process obtains the conversion result stored in the second shared cache using process-to-process communication instead of obtaining the conversion result by converting the object; and an operation controller that causes, when it is determined that the print-document data is described in a first page description language, the first mode processing section to operate, and that causes, when it is determined that the print-document data is described in a second page description language, the conversion-module activation section to operate.

3. The print-document conversion apparatus according to claim 1, wherein the shared cache is composed of individual shared caches corresponding to object type.

4. A print-document conversion method comprising:

activating, using a computer having a multi-central processing unit, as a process, a conversion module for performing conversion processing for converting print-document data, which is described in a page description language and which includes a plurality of units of processing, into print-image data in a bitmap image format or an intermediate-language format, the conversion module including activating a plurality of conversion processing threads for converting the plurality of units of processing included in the print-document data into print-image data in the bitmap image format or the intermediate-language format, assigning the plurality of units of processing included in the print-document data to the plurality of conversion processing threads which have been activated, and causing the plurality of conversion processing threads to perform processing on the plurality of units of processing, and sharing a cache with the plurality of conversion processing threads, wherein, when a conversion result that has been obtained by converting an object included in the plurality of units of processing, which have been assigned, into the bitmap image format or the intermediate-language format is stored in the shared cache, each of the plurality of conversion processing threads obtains the conversion result stored in the shared cache instead of obtaining the conversion result by converting the object, and wherein each of the plurality of conversion processing threads, before converting the object included in the plurality of units of processing inquires whether the object has previously been converted by the plurality of conversion processing threads and stored in the shared cache.

5. The print-document conversion method according to claim 4, wherein the shared cache is composed of individual shared caches corresponding to object type.

6. A non-transitory computer-readable medium storing a program causing a computer having a multi-central processing unit to function as:

a conversion-module activation section that activates, as a process, a conversion module for performing conversion processing for converting print-document data, which is described in a page description language and which includes a plurality of units of processing, into print-image data in a bitmap image format or an intermediate-language format, the conversion module including a thread activation part that activates a plurality of conversion processing threads for converting the plurality of units of processing included in the print-document data into print-image data in the bitmap image format or the intermediate-language format, an assigning part that assigns the plurality of units of processing included in the print-document data to the plurality of conversion processing threads which have been activated by the thread activation part, and that causes the plurality of conversion processing threads to perform processing on the Plurality of units of processing, and a shared cache that is shared by the plurality of conversion processing threads, wherein, when a conversion result that has been obtained by converting an object included in the plurality of units of processing, which have been assigned, into the bitmap image format or the intermediate-language format is stored in the shared cache, each of the plurality of conversion processing threads obtains the conversion result stored in the shared cache instead of obtaining the conversion result by converting the object, and wherein each of the plurality of conversion processing threads, before converting the object included in the plurality of units of processing, inquires whether the object has previously been converted by the plurality of conversion processing threads and stored in the shared cache.

7. The non-transitory computer-readable medium according to claim 6, wherein the shared cache is composed of individual shared caches corresponding to object type.

* * * * *